UNITED STATES PATENT OFFICE.

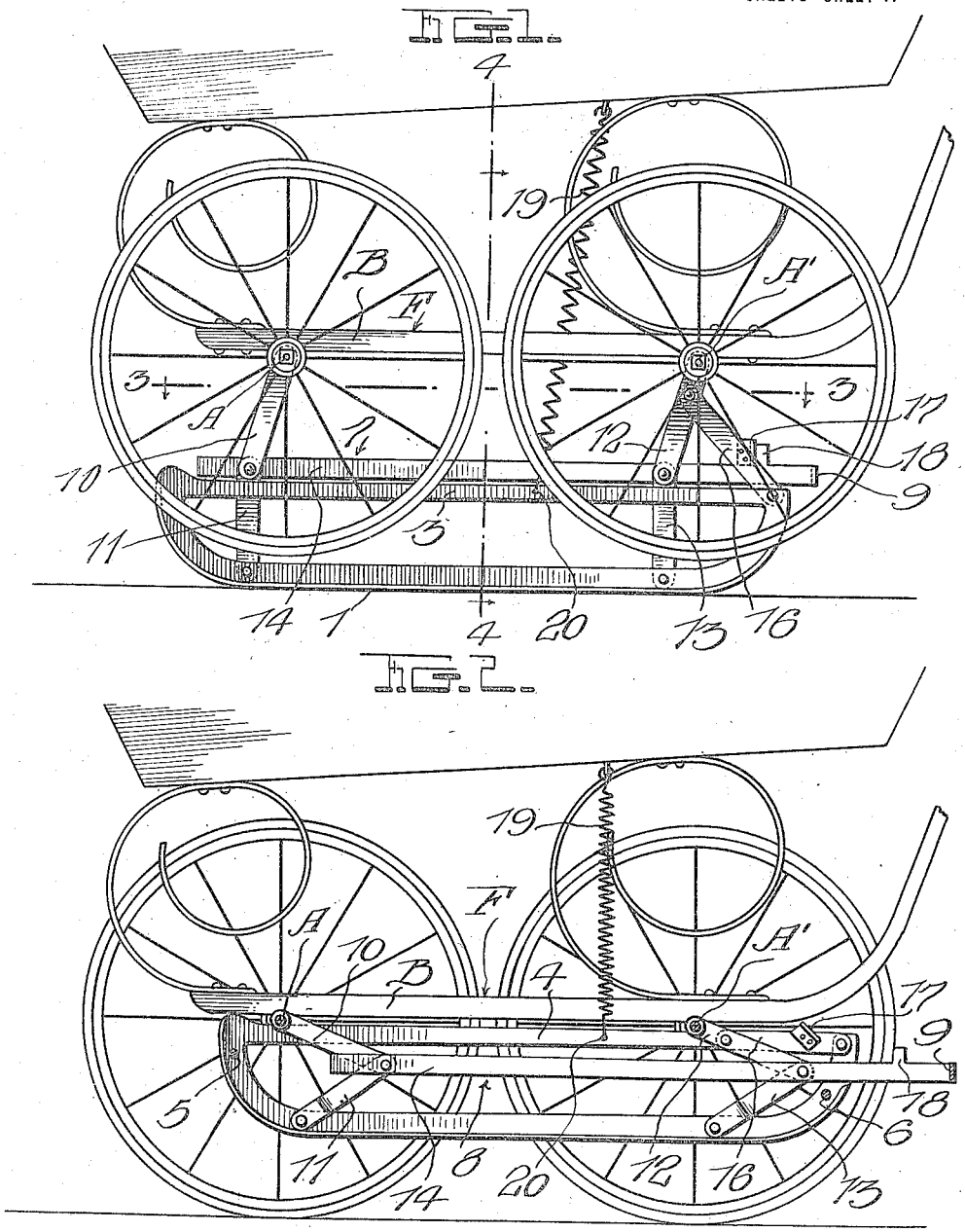

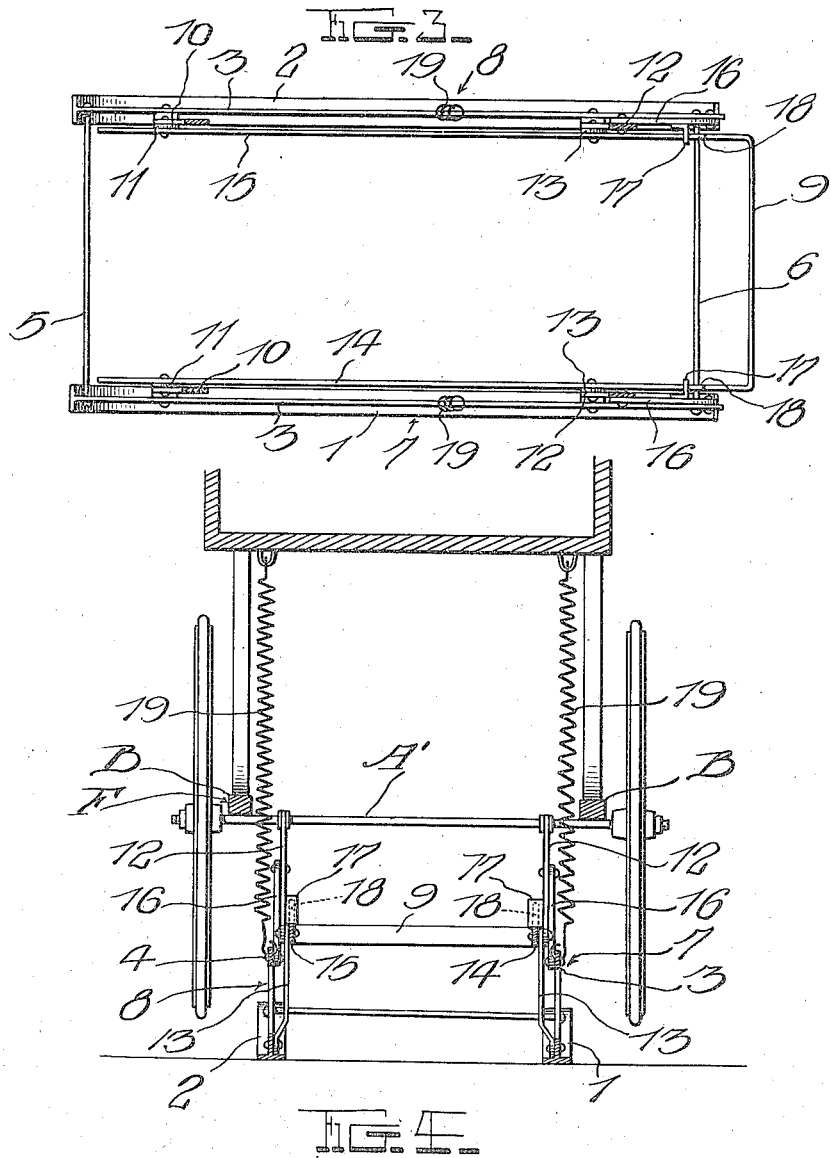

EDWIN ARTHUR THOMAS, OF ROCHESTER, NEW YORK.

RUNNER ATTACHMENT FOR BABY-CARRIAGES.

1,158,584.  Specification of Letters Patent.  Patented Nov. 2, 1915.

Application filed March 15, 1915. Serial No. 14,387.

*To all whom it may concern:*

Be it known that I, EDWIN A. THOMAS, a citizen of the United States, residing at Rochester, in the county of Monroe and State of New York, have invented certain new and useful Improvements in Runner Attachments for Baby-Carriages; and I do declare the following to be a full, clear, and exact description of the invention, such as will enable others skilled in the art to which it appertains to make and use the same.

This invention relates to improvements in runner attachments for wheeled vehicles and more especially for baby carriages.

The object of the invention is to provide a simply constructed, strong, and durable runner attachment provided with means whereby the runners may be easily and quickly raised to inoperative position or lowered to position them for supporting a vehicle and to cause the wheels of the vehicle to clear the ground.

Another object of the invention is to provide simply constructed and efficient means for locking the attachment in adjusted position.

With these and other objects in view, the invention consists of certain novel features of construction, and the combination and arrangement of parts as will be more fully described and claimed.

In the accompanying drawings: Figure 1 represents a side elevation of a carriage equipped with this improved runner attachment shown in lowered operative position. Fig. 2 is a similar view showing the attachment in raised inoperative position. Fig. 3 is a horizontal section taken on the line 3—3 of Fig. 1; Fig. 4 is a transverse vertical section taken on the line 4—4 of Fig. 1.

In the embodiment illustrated, a baby carriage is shown of ordinary construction having the usual front axle A and rear axle A' extending transversely of the carriage body and connected by a body supporting frame F which as here shown includes side bars B on which said axles are mounted.

The attachment constituting this invention comprises a pair of rigidly connected runners 1 and 2 of any suitable or desired cross sectional contour preferably of inverted T-shape in cross section. These runners 1 and 2 are shown curved upwardly at their opposite ends and the ends of each runner connected by a longitudinal bar, those of the runner 1 being connected by a bar 3 and those of runner 2 by a bar 4. These runners are of a length suited to the wheel base of a carriage which it is designed to support, the curved ends thereof permitting the vehicle to be carried up and down steps with the rear wheels clearing the runner, and the front wheels positioned so that they will not project far enough to strike curbs and the like. These runners 1 and 2 are connected with each other by transverse brace bars 5 and 6 here shown arranged at their opposite ends. These connected runners are supported on the front and rear axles A and A' by means of a toggle frame which is adapted to be opened and closed for lowering and raising the runners. This toggle frame is composed of two side members 7 and 8 connected by a rear cross bar 9 which is positioned to be actuated by the foot of the operator to dispose the runners in either raised or lowered position as desired. These side members 7 and 8 are exactly alike and hence one only will be described in detail. Each of said members comprises a pair of front links 10 and 11 and a pair of rear links 12 and 13 connected in a manner to be described, and all of which are of the same length. The front links 10 and 11 are pivotally connected at one end with each other and with the free end of the side bar 14 of a horizontal substantially U-shaped frame, the cross bar 9 of which connects the two members 7 and 8. The free end of link 10 is pivotally connected with the front axle A near one end and the free end of link 11 is pivoted to the runner 1 near its upturned portion at its front end.

The rear links 12 and 13 are pivotally connected at their inner ends with each other and with side bar 14 a distance from the front end of said bar 14 equal to the distance between the axles, the cross bar 9 being disposed some distance beyond the point of connection of the rear links 12 and 13 with the bar 14.

A link 16 is pivoted to one end of the runner side bar 3 and at its other end to the upper end of link 12 and when so positioned prevents any possibility of the carriage lowering due to the passage of the runners over rough snow or other obstructions or to their sudden passage on to a dry spot.

From the above description, it will be obvious that the U-shaped frame has its side bars 14 and 15 one connected with the inner ends of the pairs of links 10 and 11, and 12 and 13 at one side of the carriage, and the other similarly connected with the corresponding links at the opposite side of the carriage and with the cross bar 9 connecting the two side members 7 and 8 of which these bars 14 and 15 constitute a part.

A stop 17 is disposed on the inner face of each link 16 near its lower end and is adapted to be engaged by a bumper 18 on each bar 14 and 15 adjacent their rear ends so that when so engaged the runner frame will be held against further forward movement. This engagement occurs when the links 10 and 11, and 12 and 13 are in alinement, and thereby forming rigid supports for connecting the runners of the carriage.

A coiled spring 19 is attached to each runner, being here shown connected to the longitudinal bar 3 near the rear of the sled attachment, as indicated at 20, and is designed to hold said runner attachment up close to the axles when in inoperative position, and when lowered the weight of the carriage and the pull of the springs holds the toggle links 10, 11, 12 and 13 kinked in the forward position, or beyond the center with the stop 17 on link 16 abutting stop 18 on the U-shaped frame. By drawing back on the cross bar 9 which constitutes a foot lever which extends across from side to side at the rear of the carriage, the toggle links are first straightened and then buckle at their joint toward the rear, lowering the carriage toward the wheels slowly and easily without jarring or necessitating the unlocking of any device whatever. As soon as the toggle knuckle is turned back to its central position, the weight of the carriage and the pull of the springs change the runners to inoperative position and hold them suspended as shown in Fig. 2.

To lower the runner attachment, the cross bar 9 is pressed downwardly and forwardly by the foot of the operator until the stop 18 engages the stop 17 on the link 16, and when this occurs the toggle links are kinked forward and so held by the tension of the springs and the weight of the carriage as shown in Fig. 1.

From the above description it will be obvious that this improved sled attachment while normally carried by the carriage may be readily thrown into and out of operative position when it is desired to use the carriage as a sled, and coöperating means on said attachment for limiting the forward movement of said runners.

I claim as my invention:

1. The combination with a vehicle having front and rear axles carrying wheels and a supporting frame, of a runner attachment therefor including laterally spaced connected runners, toggle links connected with said runners and said supporting frame, and an operating member connected with said toggle links and movable back and forth to operate said links for raising and lowering said runners, and coöperating means on said attachment for limiting the forward movement of said runners.

2. The combination with a vehicle having front and rear axles carrying wheels and a supporting frame, of a runner attachment therefor including laterally spaced connected runners, toggle links connected with said runners and said supporting frame, an operating member connected with said toggle links and movable back and forth to operate said links for raising and lowering said runners, a coiled spring connected with said runners and with said frame for holding the runners in retracted position, and means for controlling the forward movement of said runners.

3. The combination with a vehicle having front and rear axles carrying wheels and a body supporting frame, laterally spaced connected runners, a pair of toggle links connected at one end to each of said runners in longitudinally spaced relation and connected at their other ends to said axles, an operating lever connected with the knuckles of said toggle levers, and means for holding said runners in retracted position, and links connected to hold said toggle links against collapse.

4. The combination with a vehicle having front and rear axles carrying wheels and a body supporting frame, laterally spaced connected runners, a pair of toggle links connected at one end to each of said runners in longitudinally spaced relation and connected at their other ends to said axles, a substantially U-shaped operating lever having the side arms thereof connected to the knuckles of said toggle links at opposite sides of the attachment, the cross bar of said lever being disposed at the rear of the carriage in position to be actuated by the foot of the user, and means for limiting the opening movement of said links.

5. The combination with a vehicle having front and rear axles carrying wheels and a body supporting frame, laterally spaced connected runners, a pair of toggle links connected at one end to each of said runners in longitudinally spaced relation and connected at their other ends to said axles, a substantially U-shaped operating lever having the side arms thereof connected to the knuckles of said toggle links at opposite sides of the attachment, the cross bar of said operating lever being disposed at the rear of the carriage in position to be actuated by the foot of the user, links connecting the rear ends of said runners with the rear pair of toggle links, and coöperating stops on said connecting links and operating lever for limiting the lowering movement of said attachment.

6. A runner attachment for vehicles comprising a pair of laterally spaced rigidly connected runners having upwardly curved ends, a longitudinally extending bar connecting the ends of each runner, longitudinally spaced pairs of toggle links connected at one end to each runner and at their opposite ends to the axles of the vehicle, links pivotally connected at one end to the rear ends of the longitudinal bars of each runner and at their other ends to the rear pair of toggle links at a point adjacent their connections with the vehicle, an actuating lever for operating said toggle links to raise and lower the runners, and means for holding said attachment in retracted position.

7. A runner attachment for vehicles comprising a pair of laterally spaced rigidly connected runners having upwardly curved ends, a longitudinally extending bar connecting the ends of each runner, longitudinally spaced pairs of toggle links connected at one end to each runner and at their opposite ends to the axles of the vehicle, links pivotally connected at one end to the rear ends of the longitudinal bars of each runner and at their other ends to the rear pair of toggle links at a point adjacent their connection with the vehicle, an actuating lever for operating said toggle links to raise and lower the runners, means for holding said attachment in retracted position, coöperating stops on said connecting links, and actuating lever for limiting the opening movement of said toggle links.

8. A runner attachment for vehicles comprising a pair of laterally spaced rigidly connected runners having upwardly curved ends, a longitudinal bar connecting the ends of each runner, a U-shaped frame having pairs of toggle links pivotally connected at one end with each other and with each arm of said frame at longitudinally spaced points, the free ends of each pair of links being pivotally connected with the runner and having means for connection with a vehicle axle, and coöperating means adapted for interlocking engagement to limit the lowering movement of the runners.

In testimony whereof I have hereunto set my hand in presence of two subscribing witnesses.

EDWIN ARTHUR THOMAS.

Witnesses:
  Geo. W. Thomas,
  V. M. Hall.